(12) United States Patent
Hilton et al.

(10) Patent No.: US 9,437,050 B2
(45) Date of Patent: Sep. 6, 2016

(54) MODULAR ARCHITECTURE FOR FARE COLLECTION SYSTEMS

(71) Applicant: Cubic Corporation, San Diego, CA (US)

(72) Inventors: Michael Hilton, San Diego, CA (US); Pradip Mistry, San Diego, CA (US); Katarzyna Busch-Sorensen, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/962,325

(22) Filed: Dec. 8, 2015

(65) Prior Publication Data

US 2016/0163120 A1 Jun. 9, 2016

Related U.S. Application Data

(60) Provisional application No. 62/089,112, filed on Dec. 8, 2014.

(51) Int. Cl.
*G07B 15/02* (2011.01)
*G07B 15/00* (2011.01)
*G06Q 20/32* (2012.01)
*G06Q 20/34* (2012.01)
(Continued)

(52) U.S. Cl.
CPC .............. *G07B 15/00* (2013.01); *G06Q 20/32* (2013.01); *G06Q 20/341* (2013.01); *H04L 67/12* (2013.01); *H04L 69/08* (2013.01)

(58) Field of Classification Search
USPC .................................. 235/379, 384; 194/350
See application file for complete search history.

(56) References Cited

U.S. PATENT DOCUMENTS 3,937,925 A * 2/1976 Boothroyd ............. B23K 10/02
235/379

(Continued)

FOREIGN PATENT DOCUMENTS

CN 203812284 U 9/2014
WO 2008/039796 A2 4/2008

OTHER PUBLICATIONS

International Search Report and Written Opinion for PCT/US2015/064488, mailed Feb. 26, 2016, 11 pages.

*Primary Examiner* — Daniel Hess
(74) *Attorney, Agent, or Firm* — Kilpatrick Townsend & Stockton LLP (57) ABSTRACT

A fare device having modular architecture includes a display module that controls inputs and outputs of a display of the device, a fare media reader module that sends and receives data from a fare media and processes fare transactions conducted using the fare media as payment, and an external communications module that communicates external data with one or more remote devices. A controller controls operation of the modules. A carrier board includes one or more mountings with which to communicatively couple each respective module with the at least one controller and a common communications interface coupled between the one or more mountings and the at least one controller such that each of the modules is communicatively coupled with the at least one controller. The interface includes a single communications protocol and each module has a translation element that translates a native communications protocol of a corresponding module to protocol.

20 Claims, 8 Drawing Sheets

(51) Int. Cl.
 *H04L 29/06* (2006.01)
 *H04L 29/08* (2006.01)

(56) References Cited

U.S. PATENT DOCUMENTS 6,276,602 B1 * 8/2001 Henderson ......... G07D 11/0081
 235/379

| 2004/0041021 | A1 * | 3/2004 | Nugent, Jr. ......... G07G 1/0045 235/383 |
| 2005/0178639 | A1 * | 8/2005 | Brumfield .............. G07B 15/02 194/350 |
| 2006/0181515 | A1 * | 8/2006 | Fletcher .............. G06F 3/04886 345/173 |
| 2007/0099593 | A1   | 5/2007 | Thome et al. |

* cited by examiner

MODULAR ARCHITECTURE FOR FARE COLLECTION SYSTEMS

CROSS-REFERENCES TO RELATED APPLICATIONS

This Application claims priority to U.S. Provisional Patent Application No. 62/089,112 filed Dec. 8, 2014, entitled "MODULAR ARCHITECTURE FOR FARE COLLECTION SYSTEMS," the entire disclosure of which is hereby incorporated by reference, for all purposes, as if fully set forth herein.

BACKGROUND OF THE INVENTION

In general, integrated systems have shortcomings in both maintainability and scalability due to the complexity of embedded software and hardware. If a hardware component stops being produced, it becomes difficult to find a replacement with the same functionality and interface. Software interfacing is another issue. For example, if one component is changed, typically the entire system must be reprogrammed, largely from scratch.

This can be seen in daily consumer electronics. Companies often design their products to operate over relatively short periods. Entire devices are often discarded after a single component becomes obsolete as it is often more feasible to upgrade to a newer version of the device. For example, smart phones have an average lifespan of about 1.5 years, with a new and upgraded version of such device launching each year. Modifications of a single component, such as for replacement or to add new functionality, typically result in a redesign of the entire device.

Although this approach may work for some applications, there are often high costs associated with upgrading an entire device. For example, such costs may be associated with the maintenance and regular debugging that complex software requires. Additionally, an upgrade of a single component of a conventional device requires a major redesign of the entire device, with both significant hardware and software changes being necessary to ensure the device functions properly with the new component. This is because most conventional devices are designed using an integrated approach, where each component is specifically designed and/or selected to operate within the particular design. While this may create an efficient device, the maintenance and replacement of individual components may be very costly. For example, a single change may result in altering the core functionality of the entire system. Avoidance of this may be extremely costly in terms of money and labor.

BRIEF SUMMARY OF THE INVENTION

Systems and methods described herein utilize a modular, rather than integrated, approach to device design. Devices designed using the modular approaches described herein utilize standard communication protocols that are agnostic to the hardware embedded within each module. The hardware and software modules become easier and less expensive to maintain while sustaining the integrity and functionality of the entire system for a long life cycle.

In one aspect, a portable fare collection device having modular architecture is provided. The device may include a display module configured to control inputs and outputs of a display and/or touchscreen of the portable fare collection device, a fare media reader module configured to send and receive data from a fare media and to process fare transactions conducted using the fare media as payment, and an external communications module configured for communication of external data with one or more remote devices. The device may include at least one controller configured to control operation of one or more of the modules. The device may further include a carrier board that includes one or more mountings with which to communicatively couple each respective module with the at least one controller. The carrier board may also include a common communications interface coupled between the one or more mountings and the at least one controller such that each of the modules is communicatively coupled with the at least one controller. The common communications interface may include a single communications protocol. Each of the modules may include a translation element configured to translate a native communications protocol of a corresponding module to the single communications protocol such that a component for performing a particular function of one or more of the modules is exchangeable for a different component for performing the particular function without the need to reprogram the remaining modules.

In another aspect, a method for manufacturing a portable fare device having modular architecture is provided. The method may include coupling a display module configured to control inputs and outputs of a display of the portable fare collection device to a common communications interface of a carrier board of a portable fare device. The method may also include coupling a fare media reader module configured to send and receive data from a fare media and to process fare transactions conducted using the fare media as payment to the common communications interface. The method may further include coupling an external communications module configured for communication of external data with one or more remote devices to the common communications interface. The method may include coupling at least one controller to the common communications interface such that the at least one controller controls operation of at least one of the modules. The common communications interface may include a single communications protocol. Each of the modules may include a translation element configured to translate a native communications protocol of a corresponding module to the single communications protocol such that a component for performing a particular function of one or more of the modules is exchangeable for a different component for performing the particular function without the need to reprogram the remaining modules.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Systems and methods described herein provide solutions for upgrading and replacing components of hardware device in an effective and cost efficient manner. Such systems increase the life span of the devices, making the devices more robust. This may be achieved by taking a modular, rather than integrated, approach to device design. Devices designed using the modular approaches described herein utilize standard communication protocols that are agnostic to the hardware embedded within each module. The hardware and software of modules becomes easier and less expensive to maintain while sustaining the integrity and functionality of the entire system for a long end-life.

While the discussion is largely focused on mobile fare validation devices, it will be appreciated that the modular approaches described herein may be utilized in any device application, whether the mobile device be a small mobile device or a large computing fixture. Such devices may have some of the same modules and/or components as described herein, while some may omit and/or add modules and components to create devices suitable for a particular application.

Mobile fare validators (MV) may include contactless card readers that support payments made with near field communications (NFC) powered mobile phones, standard contactless smart cards, bank-issued contactless credit and debit cards, secure Bluetooth devices, and/or other devices configured to facilitate contactless payments. Other forms of radio frequency (RF) and other contactless signals may be used for such wireless payments. MVs may be configured to read and write to contactless smart cards (CSCs), authenticate a patron using biometric profiling, perform fare processing, communicate transaction data with the backend, present information to customers via light emitting diodes (LEDs) quarter visual graphics display (QVGA) screen, LCD screen, speaker tones, and/or other audio and/or visual output components. For example, a screen, LED, and/or audio output device may be used to produce a visible and/or audible indication that a transaction was successful or failed. As one example, upon a successful transaction, a green LED may be lit, a check mark or other indication suggesting a successful transaction may be presented on the display screen, and/or a positive sound alert may be provided. Conversely, a red LED may be lit, a red X may be presented on the display screen, and/or a negative sound alert may be provided for an unsuccessful transaction. Time of flight sensors may be utilized in conjunction with the audio and/or LCD/LED feedback to help the patron correctly locate the contactless card or any other mobile RF device in the reader field. The functionality of similar MVs is described in U.S. Patent Publication 2013/0086375, U.S. Patent Publication 2012/0254040, and U.S. Patent Publication 2010/0224682, the entire contents of which are hereby incorporated by reference for all purposes.

Figure 1:
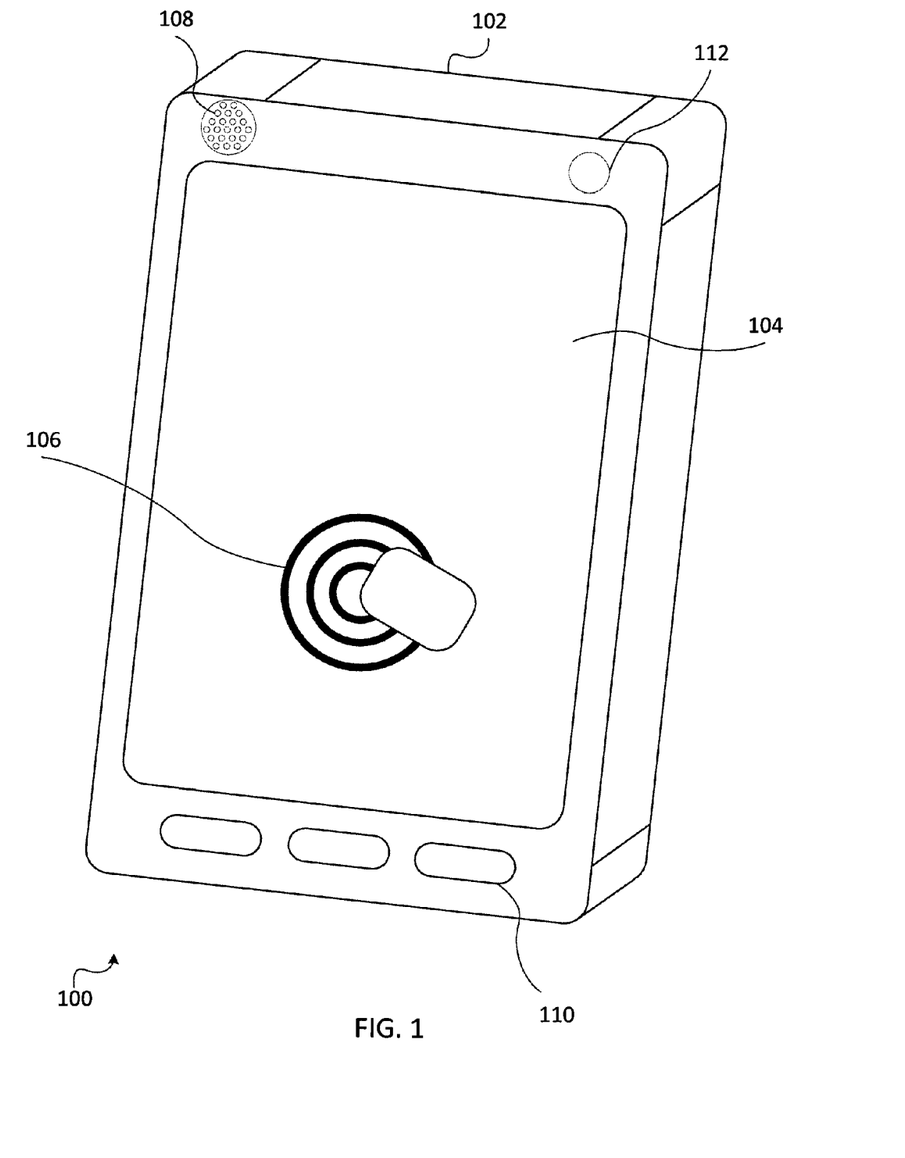
FIG. 1 is a portable fare device having modular architecture according to embodiments.

FIG. 1 depicts an embodiment of an MV 100 designable using a modular approach as described herein. MV 100 may include a rugged enclosure or housing 102 designed to withstand vibration, sudden changes in acceleration, temperature variations, vandalism, scratches, and common mistreatment associated with a public and open environment in industrial transportation. The housing 102 may be designed such that it may be opened to gain access to the internal components for repair and replacements of parts. In some embodiments, the MV 100 may be mounted on a transit gate, pole or other easily accessible structure of a transit vehicle or station, allowing a passenger to quickly and easily swipe a CSC or other payment media in front of the payment reader of the MV 100. Oftentimes, a card reader antenna (not shown) will be positioned behind and/or around a display 104, which may take up a large portion of the top surface of the MV 100. Here, the card reader antenna is positioned behind display 104 behind an icon or other indicator 106 presented on display 104 that informs passengers where to position their payment media to be read by the card reader antenna. The card reader antenna may include one or more payment readers, such as an integrated CSC reader configured to read ISO 14443 Type A CSCs and/or ISO 14443 Type B cards. Additional payment readers may include magnetic stripe readers, other RF readers, biometric readers, and the like. In some embodiments, the display 104 may be a touchscreen and/or LCD display. The display 104 may take up any part of a top surface of MV 100. For example, display 104 may take up a 60-95% of the top surface.

MV 100 may also include one or more audio output devices, such as speaker 108. Speaker 108 may be configured to emit audible indications of whether a fare media was properly read by the card reader antenna. For example, a voice or other sound may alert a user that the fare media was successfully read. Additional inputs may include one or more buttons 110. In some embodiments, the buttons 110 may include a keypad, allowing user to enter alphanumeric information into the MV 100. Additionally, one or more LEDs 112 may be included to serve as indicators as to whether a fare media was successfully read. For example, LED 112 may light up red if the card was not read properly and green if the payment media is properly read. In some embodiments, a power source of the transit vehicle or transit gate may be used to power the MV 100. For example, a power port and power management module regulating external voltages and currents may be included on a bottom surface and/or side of MV 100 that allows a power source of the transit vehicle to be coupled to the MV 100.

Systems and methods descried herein may support the interchangeability of parts while preserving the physical and electrical functionality of the whole system. The MVs created using such techniques may include network interfaces, such as wide area network (WAN), local area network (LAN) interfaces, and/or Internet of Things (IoT) network. The MVs may also include location sensors, such as global positioning satellite (GPS) sensors. The display 104 may present a user interface with full graphical capability, allowing for the display of color, text, images, photographs, animations, videos, virtual ticket agent, and the like. In some embodiments, a backlight may be included to help light the display 104 to provide greater visibility in various lighting conditions.

In some embodiments, complete modular networking may be utilized. Here, a single standard communication interface may be used to couple each module and/or component with one or more controllers. Depending on the choice of the communication interface, the single standard communication interface may also be used to route power to the sub-controllers, as in the case of Power Over Ethernet (POE). Due to sharing a common interface, the system may utilize a high number of standard networking technologies to design a reliable and affordably maintained device. The single interface provides a uniform high level communication protocol between the various components and controller. Such embodiments, a processor may function as a COM and be coupled with a carrier board configuration that includes the necessary interfaces for various modules and/or components. The system is more modular as the processing unit and interfacing are separated. This allows the processor to be upgraded or otherwise replaced without a complete redesign. Similarly, the carrier board may also be replaced if an interface needs to be redesigned.

Figure 2:
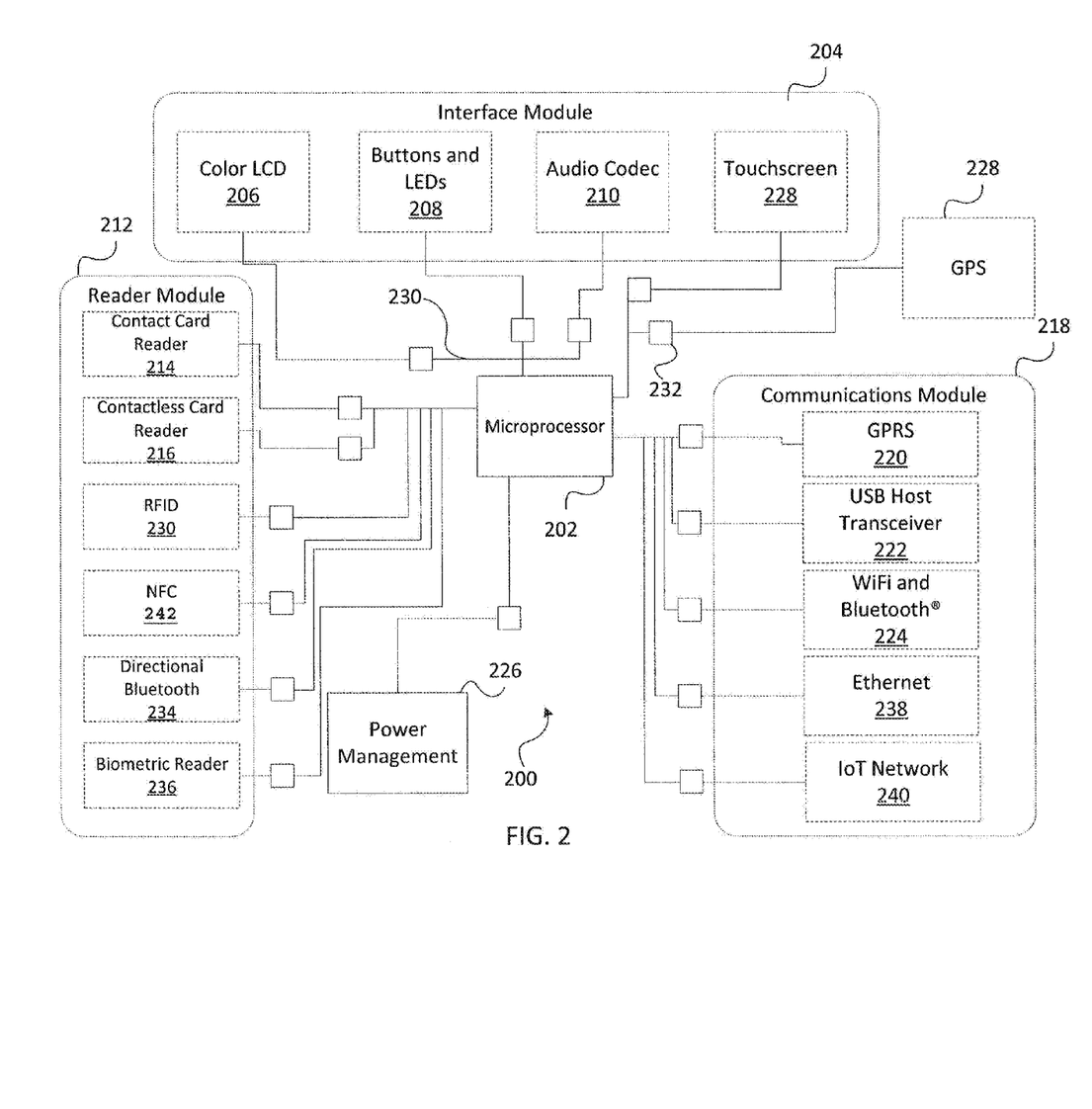
FIG. 2 is a system architecture of a modularly designed fare device according to embodiments.

FIG. 2 depicts a general overall system design of an MV 200 designed using a modular approach as described herein. MV 200 may be similar to the MV 100 described above. The MV 200 may include one or more microprocessors or other controllers 202 that manage the operations of one or more modules of the MV 200. In some embodiments, a computer on module (COM) approach may be used in the MV 200. Such designs may feature a COM using a COM express connection, such as high-density connectors, to connect to a carrier board all components and/or modules of the MV 200. Here, the components of MV 200 are arranged in modules that include components having shared or similar functionality. For example, an interface module 204 may include one or more output components. For example, a display screen 206, such as an LCD or LED monitor, buttons and/or LEDs 208, an audio codec 210 that controls audio output of a speaker, and/or a touchscreen 228 may be included in the interface module 204. The interface module may control a main display, such as display 102, through a specified interface. The display may have an audio and/or video interface, such a VGA, DVI, HDMI, and the like. A reader module 212 may include one or more payment readers, such as a contact card reader 214, a contactless card reader 216, other RFID readers 230, NFC reader 242, and/or directional Bluetooth reader 234 that are configured to read data from payment media and to process transactions. Contact card reader 214 may be configured to read payment information from a magnetic stripe or microchip of a payment media and/or another form of payment media that requires contact with a reader. Contactless card reader 216 may include a radio frequently identification (RFID) reader that supports read/write functions for multiple CSC types. For example, the RFID reader may support ISO 14443 Type A and B CSCs, MIFARE Classic™, MIFARE Ultralight™, MIFARE Ultralight C™ and/or EMVCo cards. In some embodiments, the reader module 212 may include one or more secure access modules (SAM) that enable secure communication with the CSCs and the EMV cards. Reader module 212 may also include a biometric reader submodule 236 that is usable to authenticate users of the MV 200, such as by reader a fingerprint, retinal scan, voice signature, and/or other biometric identifier.

A communications module 218 may include one or more wired and/or wireless interfaces that allow the MV 200 to communicate with other systems and devices, such as when communicating with other computing devices of the transit system, such as a central transit server. For example, a general packet radio service (GPRS) interface 220, a universal serial bus (USB) transceiver hub 222 (such as a USB 1.0, 2.0, and/or 3.0 port, a USB mini port), one or more wireless interfaces 224 such as a regular or directional Bluetooth® antenna for a personal area network (WPAN) and/or WiFi antenna, such as one supporting the IEEE 802.11 b/g standard for wireless local area network (WLAN), Ethernet port, and/or other wired and/or wireless interfaces. In some embodiments, an Ethernet submodule 238 and/or an IoT network submodule 240 may be included to facilitate communicate with other components/devices. Some components may have their own module and/or be provided outside of the modular architecture. For example, a power management module 226 and/or a GPS module 228 may be included. While grouped as shown, it will be appreciated that other arrangements of modules may be used, with modules including any number of components and/or systems of the MV 200. By grouping components within each module based on common behavior or functionalities of the various components helps reduce the communication load over each interface between the module and the controller 202.

Each of the modules and/or components may be coupled with the controller 202 using a standard interface 230. The use of a standard interface decreases the external interfacing complexity of the modules, which results in improved scalability of the system. The modular system may be modeled as independent "black boxes" that perform specified tasks. The overall system then becomes hardware agnostic, as any component may be added to the network as long as it conforms to the communication protocol. This communication protocol may be any one of a number of protocols, such as USB-serial peripheral interface (SPI), I2C, and the like. In some embodiments, Ethernet may be selected as the standard interface 230. As it is the most widely used local networking technology, Ethernet may provide the greatest flexibility in terms of compatible parts and number of functions supported and types of data that may be transmitted. Further, Ethernet consists of a set of well-defined standards that may be used to help make the system more reliable and maintainable. Use of Ethernet enhances the integrity of the system as a single malfunction of a component may not affect the functionality of other modules. In some embodiments, transmission control protocol/Internet protocol (TCP/IP) stacks 232 may be used to couple each component and/or module to the controller 202. The controller 202 runs the TCP/IP stacks 232, which serve as a sort of translation module that translates the native communications protocol of each component to Ethernet or another protocol compatible with the standard interface 230. In such a manner, as a component is replaced, only the TCP/IP stack 232 for the particular component needs to be reprogrammed. The programming of the other components may remain the same with the rest of the MV 200 operating as normal. In other words, only a portion of code that allows the component to communicate with the corresponding TCP/IP stack 232 is must be changed, as the TCP/IP stack may serve to communicate packets of information to the controller 202 over the Ethernet interface 230.

As just one example, a new contactless reader may be installed in place of contactless card reader 216. Only the portion of code associated with having the new contactless reader communicate with the TCP/IP stack 232 over the common interface 230 needs to be reprogrammed. Other modules, such as the communications module 218, will still function as they did previously, and upon reprogramming the new contactless reader portion, will even function to communicate information received from the new contactless reader. For example, payment information read from a payment media by contactless reader may be communicated to the communications module 218 for transmission to a central server of a transit system. This functionality is still supported because the communications module 218 receives packets of information from the TCP/IP stacks 232 and changes to code on the other side of those stacks 232 has no effect on the messages received by the communications module 218, thus making the modular design hardware agnostic.

Such a modular design allows off the shelf components to be used, as components do not need to be designed and/or selected to support an integrated design. For example, any component that supports a desired functionality, such as operating the display of the MV 200, may be installed in the modular MV 200 as long as the component communicates using the single communications protocol. This allows the cost of parts and the cost of design to be kept to a minimum. Additionally, a large portion of the MV 200 may serve as a base that may be reused and upgraded to keep the majority of the device in operation for a longer period of time, further keeping costs down. While shown with the three modules described above, it will be appreciated that other modules and/or numbers of modules may be utilized to design a device for a particular application. Additionally, the MV 200 may include the ability to be scaled up or down to support additional functionality to support new technologies and required functions. For example, contact card reader 214 may be removed in the instance that the transit system no longer supports magnetic stripe cards or other contact fare media. The corresponding programming for the contact card reader 214 may be deleted without altering the operation of the rest of the MV 200. Further, the MV 200 may allow for the addition of a new module. The only redesign needed is to add additional programming from the new module and/or component to a corresponding TCP/IP stack 232 and/or a possible case rearrangement. The modular design may similarly allow for a more efficient design of a new device. Components may be selected based on cost and/or functionality of the component to achieve a particular device.

The designs using modular architecture described herein decrease and/or minimize the coupling of modules. An Ethernet interface between modules reduces external interface complexity by standardizing communication. This translates to a closed model system architecture where modules are considered "black boxes" that share a defined interface. The internal complexity of the modules depends on the functional requirements of each module.

The MV may be designed with independent modules that can communicate through the Ethernet or other common communication interface. Thus, payment transactions, human interfaces (both visual and audial), and communications operations are processed by independent units that are still interconnected using the communication interface. This allows each module to be easily replaced due to malfunction, obsolescence, repair, or any other reason. This further allows standard off the shelf components to be used in each module. When a new component is required, a new off the shelf component may be selected and only a modification to the individual module (software and/or hardware changes) is needed. Additional modules may be added as needed as long as they conform to the standard interface. This allows the MV to be easily adapted to support replacements parts and new functionality as technology evolves.

There are several alternative techniques that utilize elements of modular architecture in designing an MV, each providing its own benefits. In some embodiments, off the shelf components are integrated into the MV. This may reduce the dependency on complex component customizations and long turn-around time from overall product development and testing. Additionally, off the shelf components provide a large array of continuations and available of field tested products as well as reduce the cost of materials and components as specialized integrated components are not required.

In other embodiments, multiple controllers may be used to operate individual modules, such as those grouped by similar functionality of components. In such embodiments, no single processor controls all of the device functionality, with each processor only governing a single module and/or functionality of the device. These processors may communicate with one another to automatically coordinate operations of the various modules. Such designs allow the various processors to share the processing load, thus making the overall device faster and distributing heat uniformly across the entire device and/or carrier board. Further, the complexity of software is reduced as the functionalities are divided between the modules. This also makes the software easier to maintain and debug as each module is controlled separately, thus reducing the cost of the software and controller technology.

Figure 3:
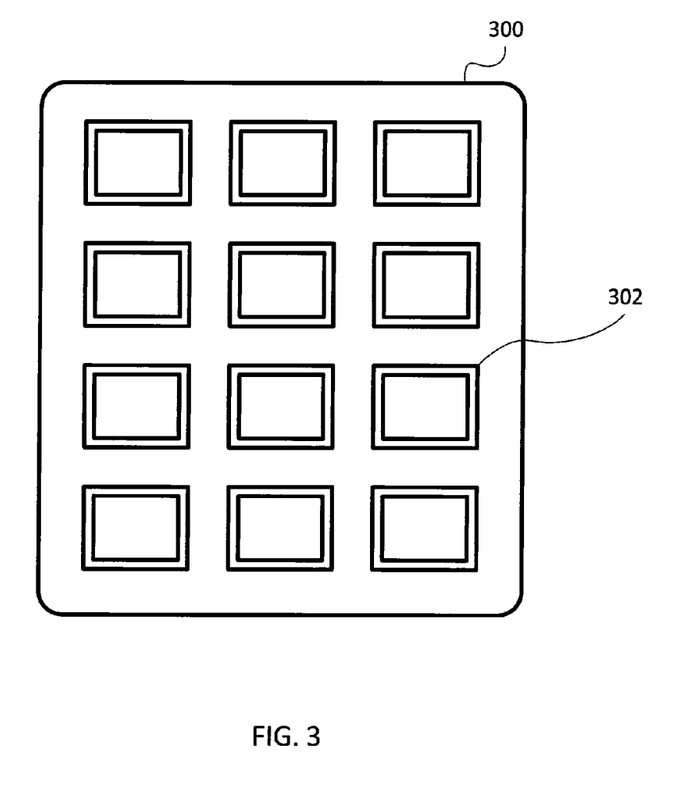
FIG. 3 is a carrier board of a modularly designed fare device according to embodiments.

Various concepts of a carrier board that supports a modular design architecture may be utilized. For example, FIGS. 3-6 describe one such carrier board concept utilizing modular design architecture that may be used in the MVs described above. FIG. 3 depicts a carrier board or base 300 where modules and switches may be positioned. Base 300 includes one or more mountings 302 positioned upon the base 300. Each mount 302 may be configured to communicatively receive or otherwise coupled with one or more components and/or modules. For example, a component may be snapped into and/or otherwise coupled with one or more mounts 302 such that a signal interface of the component may be coupled to a communications interface or bus of the base 300. In some embodiments, the mountings 302 may include one or more engagement features, such as clips to secure the modules within a mounting 302. For example, a clip, such as a clip used to secure RAM within a computing device, may be used to secure each module within a mount 302. Here, base 300 has a symmetrical design that allows modules, components, and/or switches to be positioned anywhere on the base 300. Modules may include any group of components sharing similar functionality. For example, there may be a communication module, a payment media reader module, a switch module, and/or other modules. Modules may be designed in a variety of sizes and shapes, and may be positioned horizontally or vertically along the base 300.

Figure 4:
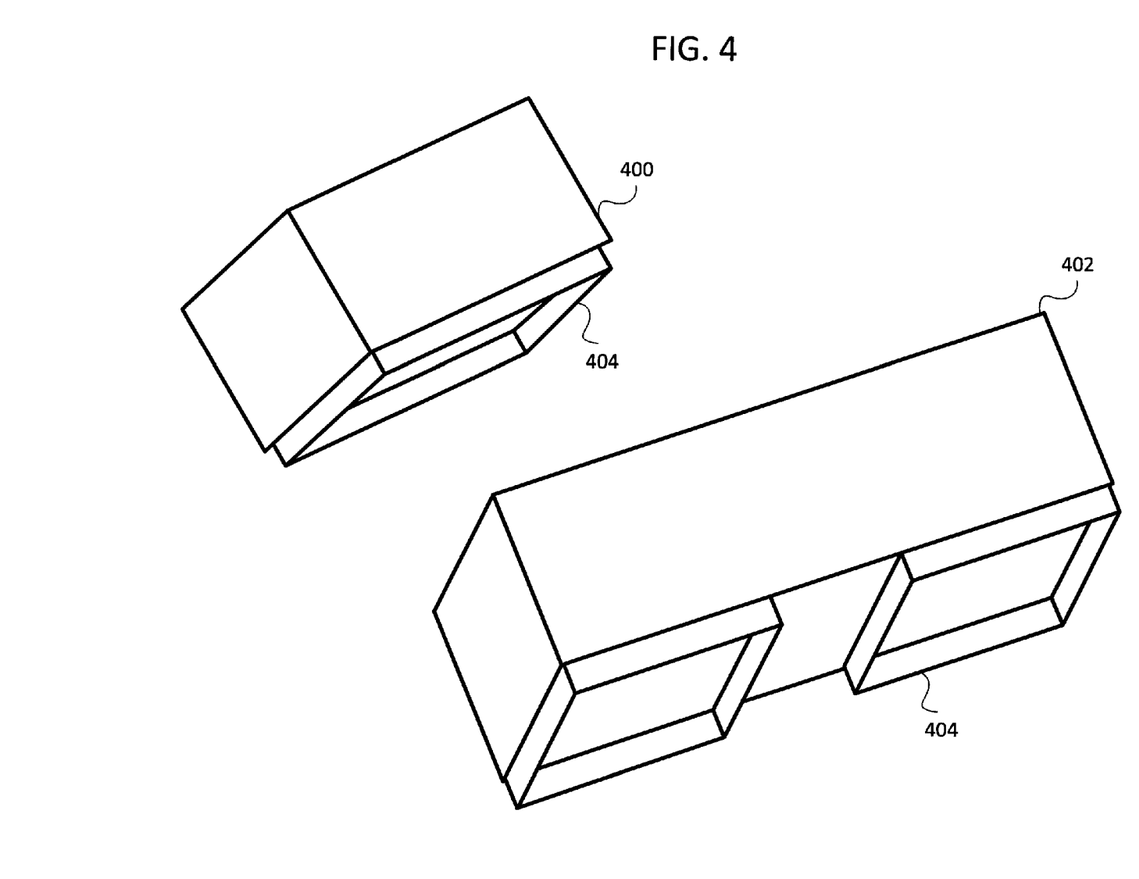
FIG. 4 depicts modular units of a modularly designed fare device according to embodiments.
Figure 5:
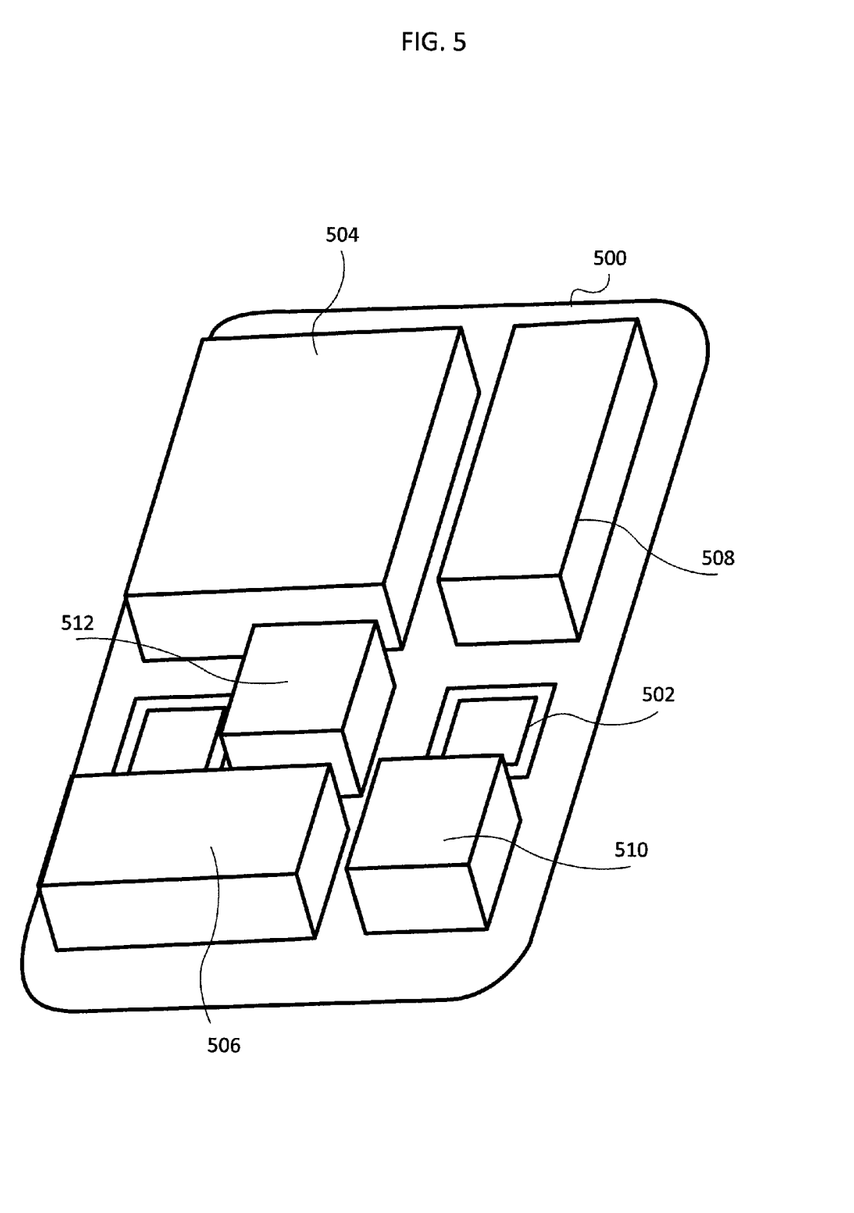
FIG. 5 depicts modular units coupled with a carrier board according to embodiments.

For example, modules 400 and 402 of FIG. 4 show single unit and dual unit modules. Each unit may be configured to couple with a single interface of base 300. For example, each module 400 and 402 may include a mounting feature 404 that may be inserted and secured within a mounting of base 300. It will be appreciated that modules including any number of units may be utilized, and shapes other than rectangles and squares may be designed. FIG. 5 shows modules of various sizes coupled with mountings 502 of a base 500. As shown here, any number of configurations of sizes, shapes, and arrangements of modules may be used on base 500. Additionally, base 500 may have fewer or more mountings 502 in any pattern or arrangement. As just one example, an interface module 504, which may include display, LED, and/or other audio visual components may be positioned over a portion of base 500. A communications module 506 and/or reader module 508, such as described in the previous paragraphs, may also be positioned on base 500. Other devices, such as a GPS 510 or other components may also be included. One or more switches 512 may also be included. The switches 512 may determine which modules are communicating over the Ethernet interface of the MV at any one time. The base 500 may include one or more unused mountings 502. This allows additional components and modules to be added when necessary.

Modules may be configured to have uniform and/or different sizes, and may be placed in various positions on a carrier board. Modules may be easily removed if a change is required. Space on the carrier board may be reserved for adding new modules that enable the addition of new functionality to the MV.

Figure 6:
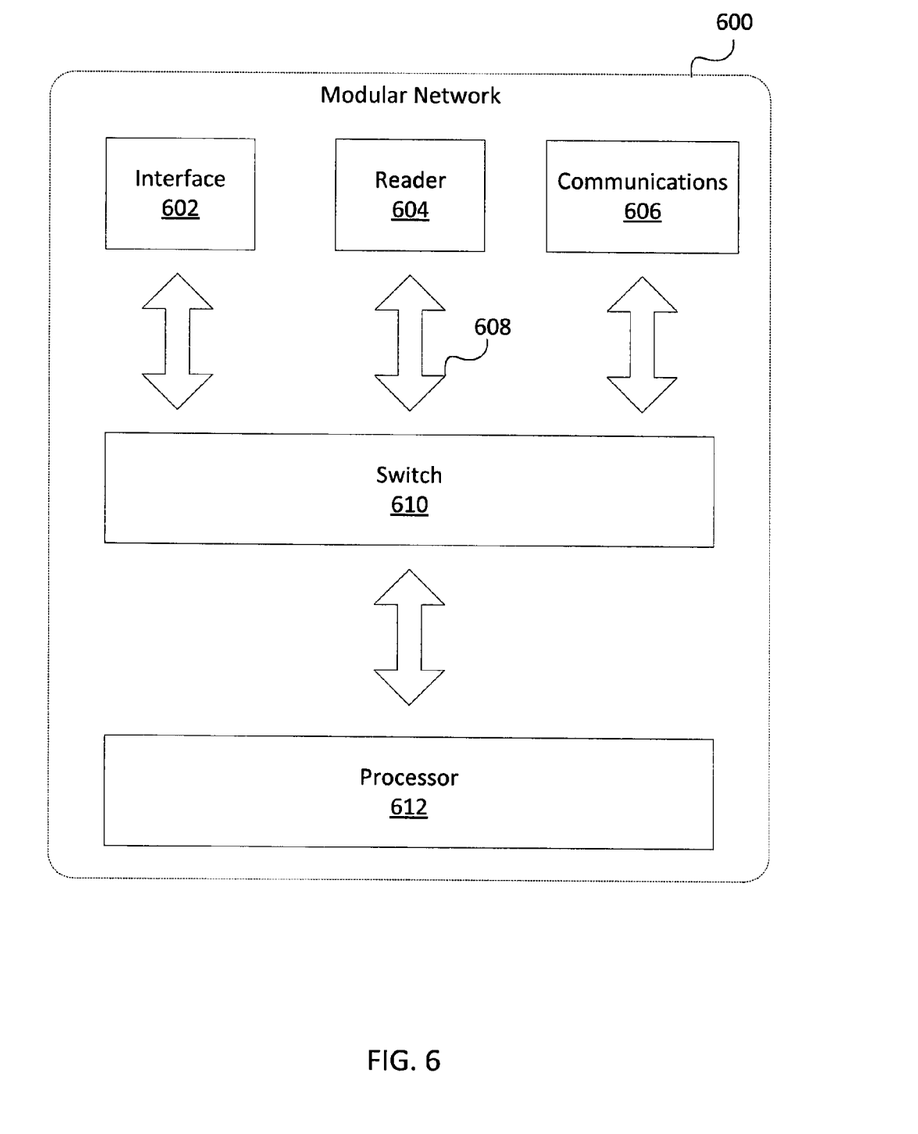
FIG. 6 is a system diagram of a modularly designed fare device according to embodiments.

Each module is connected using an Ethernet interface as is shown in a network diagram of FIG. 6. Here, modular network 600 includes multiple modules. For example, an LCD screen or interface module 602, a payment media reader module 604, a communications module 606, and/or other modules may be included. Each module may communicatively couple with an Ethernet interface 608. The Ethernet interface 608 communicates with switch or hub 610, which may then communicate with the controller 612. A TCP/IP stack (not shown) acts as a translation module between each of the components/modules and the Ethernet interface.

Subsystems of the MV may be directly translated to functionality-based modules. Modules share a standardized controller that is configured to perform the specified networking operations of the MV. Each module may have a single I/O. For example, a communications module may have a single Ethernet port. The controller inside may be connected to a WiFi/Bluetooth® antenna and/or a GPS antenna. In some embodiments, these may be off the shelf components. Another module may include a large LCD screen that also has the reader antenna integrated under it for CSC validation. Any operating system may be used, such as a Windows-based, Mac-based, and/or Linux/Unix-based OS. In some embodiments, a proprietary OS may be developed for use with the MV.

It will be appreciated that numerous other carrier board designs may be used, either with mounts or other physical couplings that allow devices to be coupled to the carrier board. In some embodiments, such couplings may serve as adapters to allow each component to be coupled to the carrier board, despite the type of external connection of the component. Additionally, adapter pieces may be used to help convert both signals and external connection mechanisms to be usable with the carrier board and/or Ethernet interface.

Figure 7:
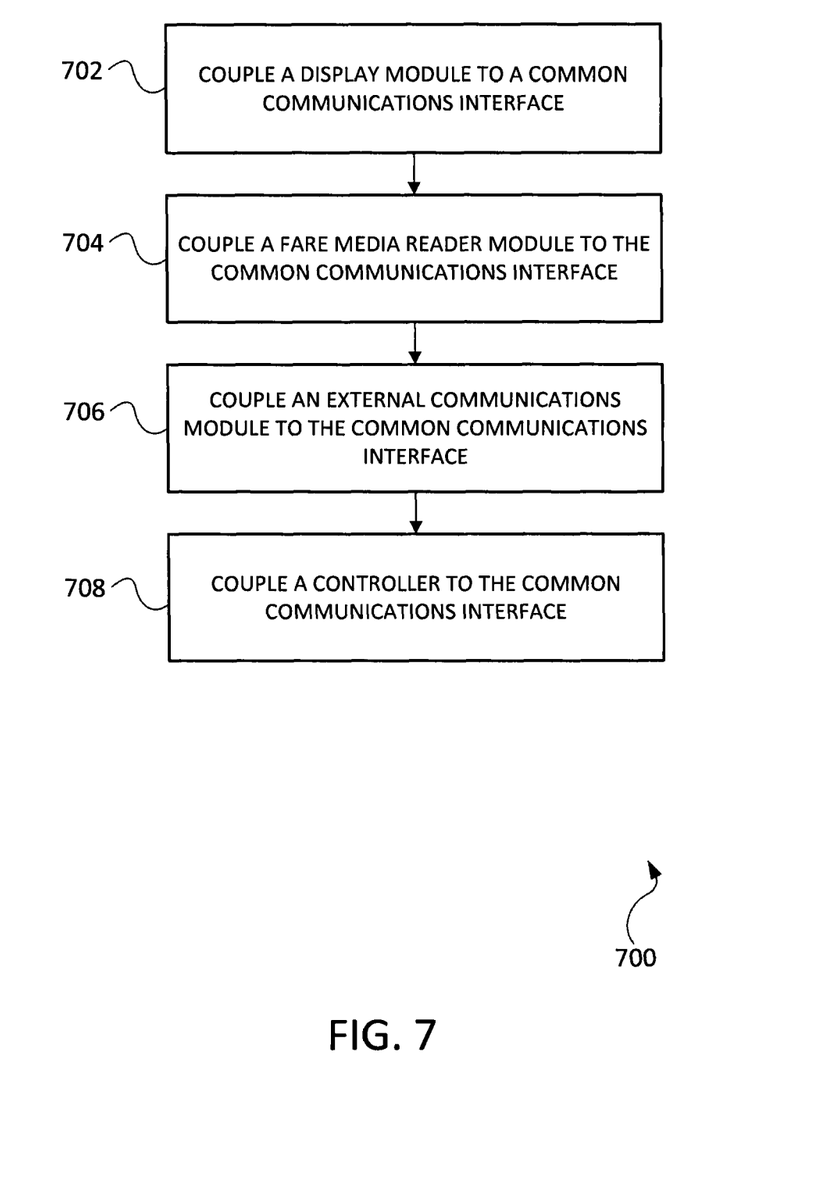
FIG. 7 is a flowchart of a process for manufacturing a fare device using modular architecture according to embodiments.

FIG. 7 depicts a process 700 for manufacturing a portable fare device having modular architecture is provided. Process 700 may be used to manufacture and/or assemble any of the MVs, carrier boards, and/or other devices described herein. The process 700 may include coupling a display module configured to control inputs and outputs of a display of the portable fare collection device to a common communications interface of a carrier board of a portable fare device at block 702. In some embodiments, the single communications interface may be an Ethernet interface. A fare media reader module configured to send and receive data from a fare media and to process fare transactions conducted using the fare media as payment may be coupled to the common communications interface at block 704. In some embodiments, the fare reader module may include a contactless card interface configured to communicate with one or both of Type A and Type B contactless smart cards. At block 706, an external communications module configured for communication of external data with one or more remote devices may be coupled to the common communications interface. In some embodiments, the external communications module may include one or more of wireless and wired communications interfaces. For example, a WiFi, Bluetooth, and/or other antenna may be included to enable such external communications. In some embodiments, the method may further include communicatively coupling a GPS sensor to the common communications interface.

At least one controller may be coupled to the common communications interface such that the at least one controller controls operation of at least one of the modules at block 708. In some embodiments, multiple controllers may be used. Each controller may be able to control the operation of at least one distinct module. In some embodiments, each module may have its own designated controller, while in other embodiments some controllers may control the operation of one module and some controllers control the operation of a single module. The common communications interface may include a single communications protocol. Each of the modules may include a translation element configured to translate a native communications protocol of a corresponding module to the single communications protocol such that a component for performing a particular function of one or more of the modules is exchangeable for a different component for performing the particular function without the need to reprogram the remaining modules. In some embodiments, the translation element may be a TCP/IP stack that helps translate the native communication protocol into the single common communication interface or protocol, such as Ethernet. In some embodiments, each of the modules includes several sub-modules or components. Each sub-module within a module may have a related functionality such that a number of interfaces of the at least one controller are minimized. Each module and/or component may be coupled with a mounting of the carrier board. In some embodiments, the carrier board may include at least one additional mounting than current modules to support an additional module. This allows new functions to be enabled for the MV.

Figure 8:
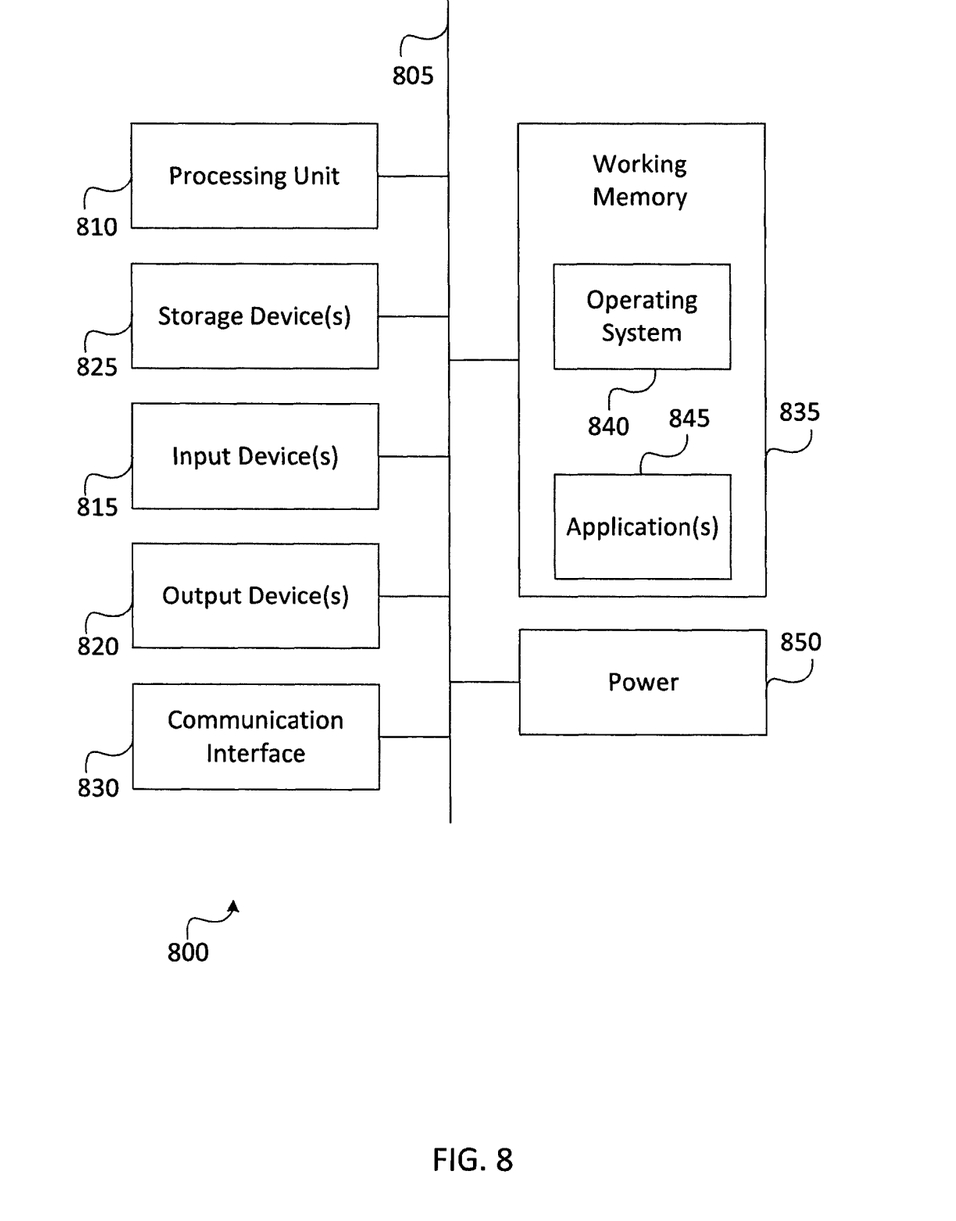
FIG. 8 is a block diagram of an example computing system according to embodiments.

A computer system as illustrated in FIG. 8 may be incorporated as part of the previously described computerized devices. For example, computer system 800 can represent some of the components of the fare collection devices as described herein. FIG. 8 provides a schematic illustration of one embodiment of a computer system 800 that can perform the methods provided by various other embodiments, as described herein. FIG. 8 is meant only to provide a generalized illustration of various components, any or all of which may be utilized as appropriate. FIG. 8, therefore, broadly illustrates how individual system elements may be implemented in a relatively separated manner.

The computer system 800 is shown comprising hardware elements that can be electrically coupled via a bus 805 (or may otherwise be in communication, as appropriate), such as the standard communications interface. The hardware elements may include a processing unit 810, including without limitation one or more general-purpose processors and/or one or more special-purpose processors (such as digital signal processing chips, graphics acceleration processors, and/or the like); one or more input devices 815, which can include without limitation a keyboard, a touchscreen, receiver, a motion sensor, a camera, a smartcard reader, a contactless media reader, and/or the like; and one or more output devices 820, which can include without limitation a display device, a speaker, a printer, a writing module, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communication interface 830, which can include without limitation a modem, a network card (wireless or wired), an infrared communication device, a wireless communication device and/or chipset (such as a Bluetooth™ device, an 502.11 device, a WiFi device, a WiMax device, an NFC device, cellular communication facilities, etc.), and/or similar communication interfaces. The communication interface 830 may permit data to be exchanged with a network (such as the network described below, to name one example), other computer systems, and/or any other devices described herein. In many embodiments, the computer system 800 will further comprise a non-transitory working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 810, applications 845, etc.) Further, connection to other computing devices such as network input/output devices may be employed.

Some embodiments may employ a computer system (such as the computer system 800) to perform methods in accordance with the disclosure. For example, some or all of the procedures of the described methods may be performed by the computer system 800 in response to processing unit 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processing unit 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processing unit 810 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 825. Volatile media include, without limitation, dynamic memory, such as the working memory 835. Transmission media include, without limitation, coaxial cables, copper wire and fiber optics, including the wires that comprise the bus 805, as well as the various components of the communication interface 830 (and/or the media by which the communication interface 830 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a non-transitory storage device 825 either before or after execution by the processing unit 810. Additionally, a power module 850 may provide a power bus or other interface to supply power to the various components.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A portable fare collection device having modular architecture, comprising:
    a plurality of modules comprising:
        a display module configured to control inputs and outputs of a display of the portable fare collection device;
        a fare media reader module configured to send and receive data from a fare media and to process fare transactions conducted using the fare media as payment; and
        an external communications module configured for communication of external data with one or more remote devices;
    at least one controller configured to control operation of one or more of the modules; and
    a carrier board comprising:
        a plurality of mountings with which to communicatively couple each of the plurality of modules with the at least one controller;
        a common communications interface coupled between the plurality of mountings and the at least one controller such that each of the plurality of modules is communicatively coupled with the at least one controller; and
        a plurality of translation elements coupled between each of the plurality of modules and the at least one controller such that information communicated from each of the plurality of modules to the at least one controller via the common communications interface passes through at least one of the one or more translation elements, wherein the one or more translation elements are configured to translate a native communications protocol of a corresponding module to a single communications protocol such that exchanging a first component for a second component of a single module only requires reprogramming one of the plurality of translation elements without the need to reprogram the remaining translation elements corresponding to other modules that were not exchanged.

2. The portable fare collection device having modular architecture of claim 1, wherein:
    the at least one controller comprises a separate controller for each of the plurality of modules.

3. The portable fare collection device having modular architecture of claim 1, wherein:
    the at least one controller comprises a plurality of controllers, each of the plurality of controllers being configured to control operation of at least one distinct module.

4. The portable fare collection device having modular architecture of claim 1, wherein:
    the single communications protocol comprises Ethernet.

5. The portable fare collection device having modular architecture of claim 1, further comprising:
    a global positioning satellite (GPS) module.

6. The portable fare collection device having modular architecture of claim 1, wherein:
    the fare reader module comprises a contactless card interface configured to communicate with one or both of Type A and Type B contactless smart cards.

7. The portable fare collection device having modular architecture of claim 1, wherein:
    the external communications module comprises one or more of wireless and wired communications interfaces.

8. The portable fare collection device having modular architecture of claim 1, wherein:
    each of the plurality of modules comprises several sub-modules, each sub-module within a module having a related functionality such that a number of interfaces of the at least one controller are minimized.

9. The portable fare collection device having modular architecture of claim 1, wherein:
    the plurality of mountings comprise at least one more mounting than current modules to support an additional module.

10. The portable fare collection device having modular architecture of claim 1, wherein:
    the plurality of translation elements comprise a TCP/IP stack.

11. A method for manufacturing a portable fare device having modular architecture, the method comprising:
    coupling a display module configured to control inputs and outputs of a display of the portable fare collection device to a common communications interface of a carrier board of a portable fare device;
    coupling a fare media reader module configured to send and receive data from a fare media and to process fare transactions conducted using the fare media as payment to the common communications interface;
    coupling an external communications module configured for communication of external data with one or more remote devices to the common communications interface; and
    coupling at least one controller to the common communications interface such that the at least one controller controls operation of at least one of a plurality of modules;
    wherein the common communications interface comprises a single communications protocol;
    wherein the portable fare device comprises a plurality of translation elements coupled between each of the plurality of modules and the at least one controller such that information communicated from each of the plurality of modules to the at least one controller via the common communications interface passes through at least one of the one or more translation elements, wherein the one or more translation elements are configured to translate a native communications protocol of a corresponding module to a single communications protocol such that exchanging a first component for a second component of a single module only requires reprogramming one of the plurality of translation elements without the need to reprogram the remaining translation elements corresponding to other modules that were not exchanged.

12. The method for manufacturing a portable fare device having modular architecture of claim 11, wherein:
   the at least one controller comprises a separate controller for each of the plurality of modules.

13. The method for manufacturing a portable fare device having modular architecture of claim 11, wherein:
   the at least one controller comprises a plurality of controllers, each of the plurality of controllers being configured to control operation of at least one distinct module.

14. The method for manufacturing a portable fare device having modular architecture of claim 11, wherein:
   the single communications protocol comprises Ethernet.

15. The method for manufacturing a portable fare device having modular architecture of claim 11, further comprising:
   communicatively coupling a global positioning satellite (GPS) module to the common communications interface.

16. The method for manufacturing a portable fare device having modular architecture of claim 11, wherein:
   the fare reader module comprises a contactless card interface configured to communicate with one or both of Type A and Type B contactless smart cards.

17. The method for manufacturing a portable fare device having modular architecture of claim 11, wherein:
   the external communications module comprises one or more of wireless and wired communications interfaces.

18. The method for manufacturing a portable fare device having modular architecture of claim 11, wherein:
   each of the plurality of modules comprises several sub-modules, each sub-module within a module having a related functionality such that a number of interfaces of the at least one controller are minimized.

19. The method for manufacturing a portable fare device having modular architecture of claim 11, wherein the portable fare device further comprises:
   a plurality of mountings with which to communicatively couple each of the plurality of modules with the at least one controller.

20. The method for manufacturing a portable fare device having modular architecture of claim 11, wherein:
   the plurality of translation elements comprise a TCP/IP stack.

* * * * *